United States Patent Office 2,729,611
Patented Jan. 3, 1956

2,729,611

UREA FORMALDEHYDE CONDENSATION PRODUCT

Louis C. Chesley, Jr., Syracuse, and Raymond G. Hart, Bainbridge, N. Y., assignors to The Borden Company, New York, N. Y., a corporation of New Jersey No Drawing. Application November 6, 1952, Serial No. 319,186

2 Claims. (Cl. 260—29.4)

The invention here presented offers a new form of resin and a superior wet strength paper containing the resin.

Many forms of amino-aldehyde condensation resins have been produced which are excellent adhesives, excellent molding resins, excellent casting resins, and effective materials for many other uses, but to the present no such resins have been made having controlled colloidal properties to improve the stability thereof and to permit of the application of such resins from the colloidal condition rather than from solution, especially in and to a paper pulp to increase the wet strength of the resulting paper.

In the making of condensation resins, the raw materials are always of small molecular size and in true water solution, and the material remains essentially water soluble through a substantial portion of the initial condensation. There is no question but that the final, insoluble resin contains molecules far larger than colloidal size, and under ordinary conditions the resin is removed from solution without ever becoming colloidal in form. Accordingly, in applying the condensation resins from water dispersion, they are usually applied from a true solution and the further condensation under the influence of the setting catalyst converts them directly to the massive, insoluble form. It does not appear that there has ever been any attempt made to produce true colloidal dispersions of amino-aldehyde resins.

Accordingly, the present invention produces a condensation resin in water dispersion which is colloidal in character over a narrow pH range, or over a narrow temperature range, such that it can be applied from colloidal form to yield a wide range of valuable and important results. The resin in its colloidal condition is particularly useful and particularly effective for increasing the wet strength of paper generally. The resin is also of considerable value for improving the "hand" and the "feel" of fabrics.

In practicing the invention, the amino compound preferably used is reacted at appropriate pH values with a relatively small amount of aldehyde, preferably formaldehyde, until a substantial degree of condensation occurs. A considerable additional amount of the aldehyde is then added, the pH value readjusted, and the condensation conducted to a stage such that the desired colloidal condition at the desired pH or the desired temperature or desired dilution is obtained. That is, the process of the present invention produces a colloidal material in which the particle size is adjusted by appropriate control of the condensation procedures to yield a partially condensed resin in which the particles of resin are too large to be truly water soluble, are of such a size as to show the Tyndall effect (the dispersion of light in a light beam), very strongly, yet to remain in stable suspension, thereby having controllable colloidal characteristics. By proper control of the particle size the resin can be caused to adhere to a wide range of materials in a condition such that the condensation can subsequently be conducted by heat or catalytic means or the like to produce a "set" resin, adherent to desired materials; or, if added to a paper pulp, substantially all of the colloidal resin particles adhere to the paper fibers and are fully set during the drying of the paper to give a very powerful adhesive effect between the laid fibers thereby greatly increasing the wet strength of any paper to which it is applied, while at the same time avoiding loss of resin in the white water or through other outlets. Other objects and details of the invention will be apparent from the following description.

In practicing the invention there is prepared a mixture of the amine and aldehyde, preferably urea and formaldehyde, at a neutral or alkaline pH. While formaldehyde is the preferred aldehyde, any of the usual aldehydes, including acetaldehyde, furfuraldehyde, butyraldehyde, propionaldehyde and the like, may also be used. For the co-condensate, a wide variety of materials are usable, including such substances as urea, melamine, thiourea, and the like. With urea and formaldehyde, the mixture is preferably made in terms of a mol ratio of urea to formaldehyde between 1 to 1.4 and 1 to 1.9. This mixture, together with the water carried in the formaldehyde solution, is heated to a suitable temperature such as 80° C. to 100° C., or higher, for an appropriate time, usually several minutes, until the condensation reaches the apparent dimethylol urea stage. This stage is most conveniently determined by the cloud point of the resin solution upon cooling.

By the phrase cloud point in resin terminology is meant that temperatures in degrees centigrade at which a resin solution becomes cloudy. This cloud appears at some temperature shortly after the beginning of refluxing a mixture of urea and formaldehyde under alkaline conditions and appears when the temperature of the mixture or a small sample thereof is lowered. The cloud is caused by the insolubility of the dimethylol urea formed in the solution which appears as the temperature is lowered from the reflux point and as the formation of dimethylol urea increases the temperature at which a cloud becomes visible is also increased. That is, when a sample of the refluxing mixture is cooled, a cloud appears at some point during the cooling cycle and the temperature at which it appears is the cloud point. If the reaction were continued for a sufficient length of time a cloud point would be obtained at the boiling point of the reactants. It is interesting to note that after a cloud point has been reached under alkaline conditions a change in pH to acid gradually diminishes the cloud point until at normal temperatures the resin is again clear.

Test method:
(1) Remove sample of resin to 25 ml. test tube.
(2) Cool while stirring.
(3) Record temperature of solution at which first faint cloud is visible.

When this stage is reached, an additional quantity of formaldehyde solution is added to obtain an overall mol ratio of urea to formaldehyde between 1 to 2.1 and 1 to 3.0. The pH of the solution may, if necessary, be adjusted at this stage with any convenient acid such as sulfuric or hydrochloric or formic or acetic or citric or phosphoric acid or the like, to a value within the range between about 2.5 and 6.0.

The second stage of the reaction may be carried out at reflux temperature, but this is not essential and there are no actual temperature limits. If time is available, it is usually preferably carried out at a lower temperature such as between 50° C. and 60° C. The reaction is conducted to such a degree of condensation that, when the resin solution is diluted with water to bring it to a range of from 2 per cent to 15 per cent solids content a colloidal suspension is obtained.

This colloidal suspension is of the essence of the invention and its presence is determined by the showing of the Tyndall effect when a beam of light is passed through the solution. It may be noted that, as the condensation proceeds, the Tyndall effect becomes more and more pronounced, with a strongly blue color. As the reaction is continued, the particles become larger so that the Tyndall effect is much less pronounced, and it is found that the optimum condition for use is the stage at which the Tyndall effect has its maximum value.

By controlling the time of condensation, or both time and temperature, the degree of condensation may be varied to produce a material which takes the form of a colloidal suspension, which remains stable over a narrow range of solids content, upon dilution; or may be obtained in stable form even over a narrow temperature range upon dilution. When the desired stage is reached, the condensation reaction may be halted by adjusting the pH of the water phase to a pH of 7 or slightly higher.

When such a solution is diluted to the desired resin concentration in water, a typical blue color characteristic of the Tyndall effect of a colloidal solution is obtained. The dilution at which the material becomes a true colloidal suspension may be controlled by adjustment of the temperature or by adjustment of the pH with appropriate acid or alkali, and at any given dilution and any given temperature the material may be made to be a colloidal suspension or a true solution as desired. For this purpose a considerable number of modifiers are available, including the water-soluble bisulfites of the various metals, the various amines, the several diamines and triamines, the several alkanolamines, and the like. The amino-aldehyde condensation products may be further modified by the incorporation of other compounds having one or more active centers. These may consist of the hydroxyl, amine, or methylol group, or a combination of these groups. The modifier may comprise any of the aliphatic amines and their hydroxy derivatives as well as the hydroxy cellulose compounds. The preferred method of incorporating the modifier is to add the modifier with the amino-aldehyde during the initial stage of condensation. However, the practice of this art is not limited to this method since similar results are obtained with a later addition of the modifier. Thus they may be added at any time during the reaction period. Acceptable mol ratios are:

| | |
|---|---|
| Bisulfite | 0.009:1 to 0.0181:1 |
| Triethanolamine | 0.009:1 to 0.048:1 |
| Hydroxyethyl ethylene diamine | 0.009:1 to 0.048:1 |
| Hydroxyethyl cellulose | 0.25% to 3% of urea |
| Ethylene diamine | 0.009:1 to 0.048:1 |

Thus, the process of the invention provides a resin material in water which can be caused to assume a condition of colloidal suspension, in which latter condition it shows a high adhesivity sufficient to adhere to fibers and many other things, the colloidal condition plus adhesivity being controlled by the character and degree of initial condensation together with control of the dilution, or pH, or both, and also by control of temperature.

Our particular condensates by their property of controlled colloid particles showed an improvement over the former resins in their storage life which was improved from 18 days at 110° F. to better than 6 months. Another improvement was the increased efficiency as a wet strength resin. This same principle was applied to the production of a "wood glue" and there was a notable improvement in storage life and reactivity. Thus there is disclosed a resin using a two stage addition of formaldehyde showing the storage life to be 48 days at 110° F. compared with the 13 days obtained with a resin made in a one stage process. Reactivity with ammonium chloride was 4 hours and 45 minutes compared to the standard life of 1 hour and 30 minutes.

*Example 1*

A mixture was prepared consisting of 580 g. of 44% formaldehyde (1.7×5 mols), which was adjusted to pH 7.05 with 3.5 ml. triethanolamine in a 3-liter, 3-mesh flask fitted with reflux condenser, stirrer, and thermometer well. 300 g. of urea were then added (1×5 mols) and heat applied to reflux. The solution was held at reflux for 20 minutes, at which time the flame was removed and 273 g. 44% formaldehyde (0.7×5 mols), 25 g. sodium bisulfite, and 10 ml. 10% formic acid were added. The resulting pH was 4.0. Heat was applied to reflux for one hour. The Bunsen flame was removed and the resin held at 70° C. for one hour. At the end of this period, the resin had a Gardner viscosity of "O." The pH was adjusted to 7.5 with 6.5 ml. triethanolamine.

This resin when diluted, 100 parts by weight of resin to 200 parts by weight of water, resulted in a typical colloidal solution.

*Example 2*

A mixture was prepared consisting of 1200 g. of 45% formaldehyde, 149 g. of triethanolamine, and 720 g. of urea. The pH of this mixture was adjusted to 7.2 with muriatic acid 20° Bé. in a 3-liter, 3-neck flask fitted with a reflux condenser, stirrer, and thermometer well. Heat was applied and the mixture brought to reflux at 100° C.; at this point 645 g. of 45% formaldehyde were added and the pH adjusted to 5.0 with formic acid. This required 110 ml. of 25% acid. The resin was heated to maintain slow reflux until the viscosity as determined on the Gardner-Holdt scale was between "H" and "I." The resin was then cooled to 60° C. and further condensed to a viscosity of "N–O." To this resin solution were added 50 ml. of triethanolamine and 300 ml. of water. The pH was 7.3. This resin, when diluted to a 5% solution, gave the typical blue haze of a colloid which remained even when the temperature was lowered to 10° C. The solution could be diluted with water until its solubility could be considered infinite.

*Example 3*

360 g. of bone dry unbleached kraft in 23 liters of water were placed in a valley beater and a 4500 gram weight placed on the bed plate arm. The pulp was then beaten to a freeness of 500 ml. Canadian Standard. The pulp slurry was then diluted to 0.5% consistency and to this dilute pulp a quantity of the resin from Example 2 was added. Portions of this resin-pulp mixture were removed to the Noble & Wood sheet machine and the pH adjusted to 4.5–5.0 with a 10% alum solution. Standard sheets were made and dried 5 minutes at 240° F. These sheets were further cured for 15 minutes at 110° C. After conditioning the sheets at 73° F. and 50% R. H. for 24 hours, they were tested for wet and dry strength. Results are tabulated below:

| Percent Resin Concentration | Dry Tensile, Lbs./In. | Wet Tensile, Lbs./In. | WT/DT, Percent | Dry Mullen, Lbs./Sq. In. | Wet Mullen, Lbs./Sq. In. | WM/DM, Percent |
|---|---|---|---|---|---|---|
| ½ | 30.0 | 5.6 | 18.6 | 47 | 11.5 | 24 |
| 1 | 32.4 | 7.7 | 23.7 | 45 | 20.1 | 45 |
| 2 | 33.5 | 9.5 | 31.2 | 49 | 27.6 | 56 |
| 3 | 31.4 | 11.6 | 37.0 | 50 | 35.2 | 71 |

*Example 4*

A sample of the resin prepared as in Example 2 was diluted to a 2% solution by weight at a temperature of 100° F. After cooling to 80° F., 3% of diammonium phosphate on the resin weight was added as a hardener. This activated resin solution was then used to treat samples of 50–50 viscose acetate, gabardine, and combed cotton percale. The material was padded through the resin until a wet pickup equivalent to 75% to 85% of the cloth weight was obtained. After treating, the cloth was dried for two minutes at 250° F. and then given a heat treatment at 325° F. to cure the resin. Following this cure the cloth was washed in a solution consisting of 0.25% of mild soap and 0.25% of soda ash to remove residual resin and hardener. After drying and conditioning, the strength of the cloth was measurably increased.

Example 5

A mixture was prepared consisting of 1380 grams of 44% formaldehyde and 720 grams of urea. This mixture was added to a 3-neck, 3-liter flask equipped with a reflux condenser, thermometer well and stirrer. The pH of the reaction mixture was adjusted to a pH of 7.05 using 4 grams trisodium phosphate and 3 cc. of 10% formic acid. Heat was applied and the reaction mixture brought to reflux. Reflux was continued until a cloud of 35° C. was reached. At this point 163 grams of 44% formaldehyde was added and the pH adjusted to 5.48 with 10% formic acid. Heat was again applied to bring the reaction to reflux and continued until a viscosity of C+ on the Gardner Holdt scale was reached. The pH was then adjusted to 7.35 with sodium hydroxide. The resin was vacuum concentrated to a solids content of 64.4%. A portion of this resin stored at 110° F. showed a life of 48 days. A resin made using a 1 stage addition of formaldehyde gave 13 days at 110° F. A gel test on the above resin using ammonium chloride as a catalyst gave a gel in 4 hours and 45 minutes compared to 2 hours and 30 minutes with a 1 stage addition of formaldehyde.

Gluings were made from resins similar to the above example using standard wood gluing procedures with the following results.

| Gluing Results | 3 birch/birch | 3 poplar/poplar |
|---|---|---|
| Plywood Size | 8 x 16 | 8 x 16 |
| Mach Spr., by Application | single | single |
| Spr., lbs./M sq. ft | 38 | 38 |
| Assembly time, mins | 15 | 15 |
| Pressure, lbs./sq. in | 150 | 150 |
| Pressure period, hrs | 7 | 7 |
| Maturing period, days | 10 | 10 |
| Temperature, ° F | 75 | 75 |
| Panels: | | |
| Dry Shear | 440-50 | 320-75 |
| Wet Shear | 450-85 | 250-100 |
| 3½ cycle | 360-25 | 240-90 |

Thus the resin of the present invention shows an adhesivity having many different characteristics from prior adhesives. In water suspension the resin will adhere practically completely to wet paper fiber and upon drying of the fiber the resin adheres between fibers in a way which gives a very high wet strength. It shows a similar very high adhesion from water suspension to such materials as asbestos fiber, glass fiber and other mineral filaments. It is particularly advantageous for the enameling of copper wire since by the proper adjustment of concentration, temperature, acidity, and the like, a layer of resin of any desired thickness can be applied to bare copper wire from a water carrier rather than from the spirit or organic solvent carrier peviously used. Also it can be equally well applied to cotton covered copper wire having either a single wrapping or a double wrapping to yield a much superior insulation compared to cotton with paraffin wax. A simple heater such as a tube oven is ample to evaporate the carrying water and "set" the resin. Appropriate plasticizers and flexibilizers may likewise be included in emulsion from the carrying water.

As shown in Example 5, the resin of the present invention is a very excellent adhesive for the laminating of wood. It is also an excellent adhesive for many other adhesive procedures.

Thus, the process of the invention yields a new and valuable resin characterized by the capability of forming either a true solution or a colloidal suspension according as the temperature, dilution, and pH depart from, or fall within, critical values for the particular resin.

While there are above disclosed but a limited number of embodiments of the material and process of the present invention it is possible to provide still other embodiments without departing from the inventive concept herein disclosed, and it is therefore desired that only such limitations be imposed on the appended claims as are stated therein or required by the prior art.

The invention claimed is:

1. In making a resin that gives a stable colloidal solution in water, the process which comprises warming a mixture of about 1.4–1.9 moles of formaldehyde with 1 mole of urea in aqueous solution and at a pH at least as high as approximately 7, continuing the warming only until condensation reaches the stage at which dimethylol urea is formed and a specimen of the solution, on cooling, shows a positive cloud test, then adding additional formaldehyde in amount to make the total formaldehyde introduced about 2.1–3 moles, adding an acid catalyst of urea formaldehyde condensation in any amount required to establish the pH approximately within the range 2.5–6, continuing the warming until the product, when an alkali is added to a sample thereof in amount to establish the pH at 7.3 and the sample diluted with water to concentration 2%–15% solids, gives a colloidal solution with a strong Tyndall effect, then discontinuing the warming and adding an alkali in amount to neutralize any acidity of the product.

2. A urea formaldehyde condensation product characterized by forming a stable colloidal solution at a concentration of 2%–15% of total solids in water and at a pH of 7.3 and being the final product of the process of claim 1.

References Cited in the file of this patent

UNITED STATES PATENTS

| | | |
|---|---|---|
| 1,901,373 | Lionne | Mar. 14, 1933 |
| 2,016,285 | Kraus | Oct. 8, 1935 |
| 2,034,479 | MacDonough | Mar. 17, 1936 |
| 2,345,543 | Wohnsiedler et al. | Mar. 28, 1944 |
| 2,407,376 | Maxwell | Sept. 10, 1946 |
| 2,559,578 | Suen | July 10, 1951 |